(12) United States Patent
Yi et al.

(10) Patent No.: US 8,272,774 B2
(45) Date of Patent: Sep. 25, 2012

(54) LIGHT GUIDING PLATE, AND BACKLIGHT ASSEMBLY AND DISPLAY DEVICE HAVING THE SAME

(75) Inventors: Sang-Min Yi, Suwon-si (KR);
Young-Bee Chu, Yongin-si (KR);
Jeong-Min Seo, Seongnam-si (KR);
Jae-Lok Cha, Seongnam-si (KR);
Ah-Ram Lee, Jeonju-si (KR)

(73) Assignee: Samsung Electronics Co., Ltd. (KR)

( * ) Notice: Subject to any disclaimer, the term of this patent is extended or adjusted under 35 U.S.C. 154(b) by 328 days.

(21) Appl. No.: 12/554,549

(22) Filed: Sep. 4, 2009

(65) Prior Publication Data

US 2010/0118519 A1    May 13, 2010

(30) Foreign Application Priority Data

Nov. 7, 2008  (KR) .................. 10-2008-0110401

(51) Int. Cl.
*F21V 7/04* (2006.01)
(52) U.S. Cl. .................. 362/625; 362/628; 362/606
(58) Field of Classification Search .................. 362/26, 362/27, 600, 606, 607, 608, 610, 620, 621, 362/616, 623, 625–628; 349/65
See application file for complete search history.

(56) References Cited

U.S. PATENT DOCUMENTS

| | | | | |
|---|---|---|---|---|
| 6,705,739 B2 * | 3/2004 | Kuo | ............................. | 362/26 |
| 6,802,619 B2 * | 10/2004 | Ohizumi et al. | .............. | 362/603 |
| 7,040,796 B2 * | 5/2006 | Sugiura et al. | ................ | 362/608 |
| 7,401,963 B2 * | 7/2008 | Stefanov et al. | ............. | 362/620 |
| 7,607,816 B2 * | 10/2009 | Li | ................................. | 362/621 |
| 7,703,967 B2 * | 4/2010 | Parker | ........................... | 362/606 |
| 7,808,576 B2 * | 10/2010 | Takahashi et al. | ............. | 349/65 |
| 2002/0021563 A1 * | 2/2002 | Ohsumi | ............................ | 362/31 |
| 2002/0105793 A1 * | 8/2002 | Oda et al. | ........................ | 362/31 |
| 2003/0007342 A1 * | 1/2003 | Suzuki et al. | ..................... | 362/31 |
| 2003/0043568 A1 * | 3/2003 | Suzuki et al. | ..................... | 362/31 |
| 2006/0171167 A1 * | 8/2006 | Ohkawa | ........................ | 362/620 |
| 2007/0223251 A1 * | 9/2007 | Liao | ............................... | 362/615 |
| 2008/0043172 A1 * | 2/2008 | Kim et al. | ........................ | 349/65 |
| 2008/0112185 A1 * | 5/2008 | Noh et al. | ...................... | 362/606 |
| 2008/0186739 A1 * | 8/2008 | Chen et al. | ..................... | 362/620 |
| 2009/0213619 A1 * | 8/2009 | Nakamoto et al. | ............ | 362/621 |

FOREIGN PATENT DOCUMENTS

| | | |
|---|---|---|
| JP | 2006-164530 | 6/2006 |
| KR | 10-2007-0052087 | 5/2007 |
| KR | 10-2007-0121135 | 12/2007 |

* cited by examiner

Primary Examiner — Julie Shallenberger
(74) Attorney, Agent, or Firm — Innovation Counsel LLP (57) ABSTRACT

A light guiding plate to enhance uniformity of brightness and a backlight assembly and a display device having the same in one or more embodiments. In one embodiment, the light guiding plate includes a plurality of the linear shaped prisms on a back surface thereof, and the linear shaped prisms are omitted partially at the incident portion of the light guiding plate such that a non-prism area, connection area, and prism area are formed in stated order from the incident portion end on the back surface of the light guiding plate. Therefore, the display device having the light guiding plate is adapted to increase a uniformity of brightness of the edge type backlight, and the display quality can be improved.

20 Claims, 7 Drawing Sheets

FIG. 10

LIGHT GUIDING PLATE, AND BACKLIGHT ASSEMBLY AND DISPLAY DEVICE HAVING THE SAME

RELATED APPLICATIONS

This application claims priority to and the benefit of Korean Patent Application No. 2008-110401, filed on Nov. 7, 2008, in the Korean Intellectual Property Office (KIPO), the contents of which are herein incorporated by reference in their entirety.

BACKGROUND

1. Technical Field

The present invention relates to a light guiding plate, and to a backlight assembly and a display device having the light guiding plate. More particularly, the present invention relates to a light guiding plate that may be capable of enhancing uniformity of brightness, and to a backlight assembly and a display device containing the light guiding plate.

2. Related Art

A liquid crystal display (LCD) device has various advantageous characteristics in thickness, durability, weight, power consumption, etc. The LCD device is a type of flat panel display device that includes a LCD panel that has two substrates and a liquid crystal layer interposed therebetween. Generally, in the LCD device, an arrangement of liquid crystals of the liquid crystal layer vary in response to an applied electric field, and thus, a light transmittance can be changed to thereby display an image.

However, a conventional liquid crystal display is typically not a self-luminescent display device. Therefore, the liquid crystal display needs to use an outside light source unit for illuminating uniformly the viewing plane of the liquid crystal panel to display an image. A backlight assembly is used to provide light to the viewing plane of the liquid crystal panel. The backlight assembly is classified as an edge type or a direct type in accordance with the location of a light source.

The edge type backlight has at least one light source installed at one or both side edges of a light guiding plate and irradiates incident light from the light source to a liquid crystal display panel through the light guiding plate and a plurality of optical sheets. The direct type backlight has a plurality of light sources disposed under the liquid crystal display panel and irradiates incident light from the light sources to the liquid crystal display panel through a diffusion plate and a plurality of optical sheets. Thus, increasing luminance uniformity of the light emitted from the backlight assembly toward the liquid crystal display panel is an important technical problem.

Figure 1:
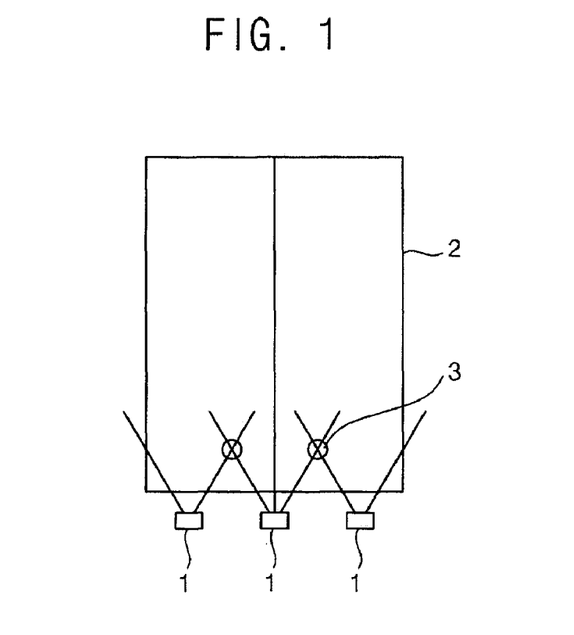
FIG. 1 is a plain view illustrating one example of an edge type backlight assembly adopting LEDs.

FIG. 1 represents one example of an edge type backlight assembly adopting LEDs (i.e., light emitting diodes) as a light source.

Referring to FIG. 1, a plurality of LEDs 1, acting as point light sources, are disposed at one side edge of a light guiding plate 2 along the light incident portion of the light guiding plate 2 in a line. Light emitted from the LEDs 1 is input through the incident surface of the light guiding plate 2, converted as plane light source at the inside of the light guiding plate and emitted toward the liquid crystal panel (not shown).

The LEDs emanate a light within a particular angle range. Therefore, the backlight assembly, as shown in FIG. 1, has a brightness that appears higher where the lights incident from the LEDs 1 to a light guiding plate 2 cross than in other parts of the plate 2. A bright spot occurs where the light from the different LEDs 1 cross in the light guiding plate 2. The bright spot appears in the shape of a ring, circle, or ellipse and is known as a "hot spot" (corresponds to the part 3, in FIG. 1) in accordance with the shape.

Due to this phenomenon, in the backlight assembly and the liquid crystal display device of the related art, the brightness of the display picture is non-uniform because some part of the light guiding plate 2 appears to be brighter than another part.

SUMMARY

The present invention in one embodiment provides a light guiding plate capable of enhancing uniformity of brightness of edge type backlight assembly.

The present invention in other embodiments also provides a backlight assembly and a display device adopting the above-mentioned light guiding plate.

A light guiding plate in accordance with one embodiment of the present invention includes a light incident surface, an opposite surface, a light emitting surface, and a light guide surface. Light emitted from a light source enters into the light incident surface. The opposite surface faces the light incident surface. The light emitting surface is connected between the light incident surface and the opposite surface. The light guide surface faces the light emitting surface. The light guide surface has a prism area in which a plurality of linear shaped prisms extended from the light incident surface toward the opposite surface is formed, a non-prism area in which a flat area is formed adjacent to the light incident surface, and a connection area interposed between the prism area and the non-prism area and having different height with respect to the non-prism area.

The non-prism area may make contact with the light incident surface and may have a band shape having a constant width. The connection area may have a stepped portion formed by protruding from the non-prism area toward an exterior to the light guiding plate. A thickness of the light guiding plate in the connection area may be greater than a thickness of the light guiding plate in the non-prism area. The thickness of the light guiding plate in the connection area may be equal to or smaller than a thickness of the light guiding plate in the prism area. An inclined surface making contact with the stepped portion may be formed on an end of each of the linear shaped prisms, which is extended toward the connection area. The inclined surface may have a substantially triangular shape. The connection area may have a level surface substantially perpendicular to the stepped portion, and an inclined surface may be formed on an end of each of the linear shaped prisms making contact with the level surface.

A backlight assembly in accordance with another embodiment of the present invention includes a light source, a light guiding plate, and optical sheets. The light source generates light. The light guiding plate includes a light incident surface into which the light is incident, an opposite surface facing the light incident surface, a light emitting surface connected between the light incident surface and the opposite surface, and a light guide surface facing the light emitting surface. The light guide surface has a prism area in which a plurality of first linear shaped prisms extended from the light incident surface toward the opposite surface is formed, a non-prism area in which a flat area is formed adjacent to the light incident surface and a connection area interposed between the prism area and the non-prism area and having different height with respect to the non-prism area. The optical sheets are disposed on the light emitting surface.

The connection area may have a stepped portion formed by protruding from the non-prism area toward an exterior to the light guiding plate. A thickness of the light guiding plate in the connection area may be greater than a thickness of the light guiding plate in the non-prism area. The thickness of the light guiding plate in the connection area may be equal to or smaller than a thickness of the light guiding plate in the prism area. An inclined surface making contact with the stepped portion may be formed on an end of each of the first linear shaped prisms, which is extended toward the connection area. A plurality of second linear shaped prisms may be formed on a back surface of the optical sheets, and an extension direction of the first linear shaped prisms may be substantially perpendicular to an extension direction of the second linear shaped prisms.

A display device in accordance with still another embodiment of the present invention includes a display panel displaying an image, a light source emitting light for displaying the image, a light guiding plate, and optical sheets. The light guiding plate includes a light incident surface into which the light is incident, an opposite surface facing the light incident surface, a light emitting surface connected between the light incident surface and the opposite surface, and a light guide surface facing the light emitting surface. The light guide surface has a prism area in which a plurality of first linear shaped prisms extended from the light incident surface toward the opposite surface is formed, a non-prism area in which a flat area is formed adjacent to the light incident surface, and a connection area interposed between the prism area and the non-prism area and having different height with respect to the non-prism area. The optical sheets are disposed on the light emitting surface.

A portion of the first linear shaped prisms adjacent to the light incident surface may be removed to form the non-prism area, and the connection area may have a stepped portion formed by protruding from the non-prism area toward an exterior to the light guiding plate. A thickness of the light guiding plate in the connection area may be greater than a thickness of the light guiding plate in the non-prism area. The thickness of the light guiding plate in the connection area may be equal to or smaller than a thickness of the light guiding plate in the prism area. A plurality of second linear shaped prisms may be formed on a back surface of the optical sheets, and an extension direction of the first linear shaped prisms may be substantially perpendicular to an extension direction of the second linear shaped prisms. The light source may include a light emitting diode (LED), and at least one LED is disposed on at least one side surface of the light guiding plate, which includes the light incident surface.

BRIEF DESCRIPTION OF THE DRAWINGS

Embodiments of the present invention will become more apparent by describing in detail exemplary embodiments thereof with reference to the accompanying drawings, in which.

DETAILED DESCRIPTION

Embodiments of the present invention now will be described more fully hereinafter with reference to the accompanying drawings, in which exemplary embodiments of the invention are shown. This invention, however, may be embodied in many different forms and should not be construed as limited to embodiments set forth herein; rather, embodiments are provided so that this disclosure will be thorough and complete, and will fully convey the scope of the invention to those skilled in the art. It will be understood that when an element is referred to as being "on" or "onto" another element, it may be directly on the other element or intervening elements may also be present. In contrast, when an element is referred to as being "directly on" another element, there are no intervening elements present. Like reference numerals refer to similar or identical elements throughout.

Figure 2:
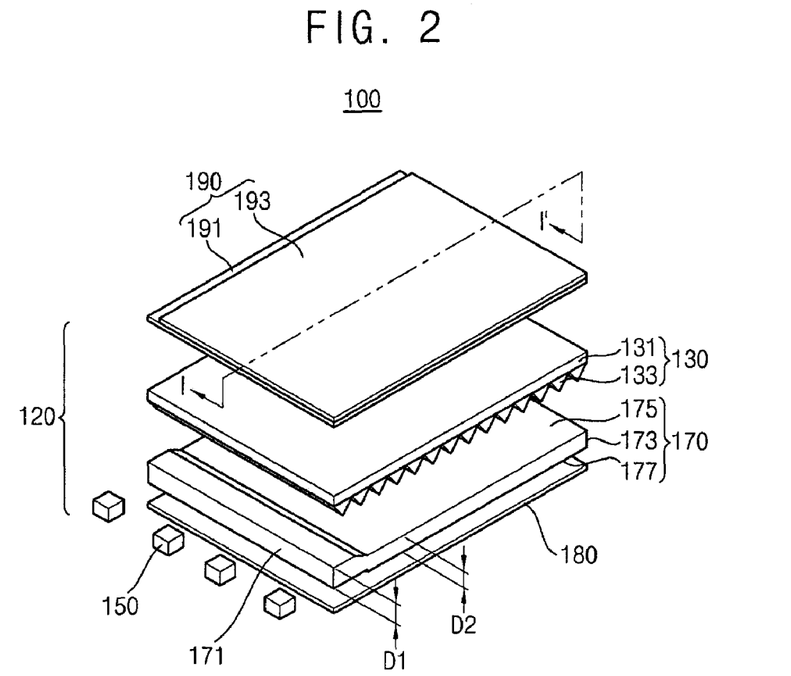
FIG. 2 is an exploded perspective view illustrating a display device, according to an exemplary embodiment of the present invention.
Figure 3:
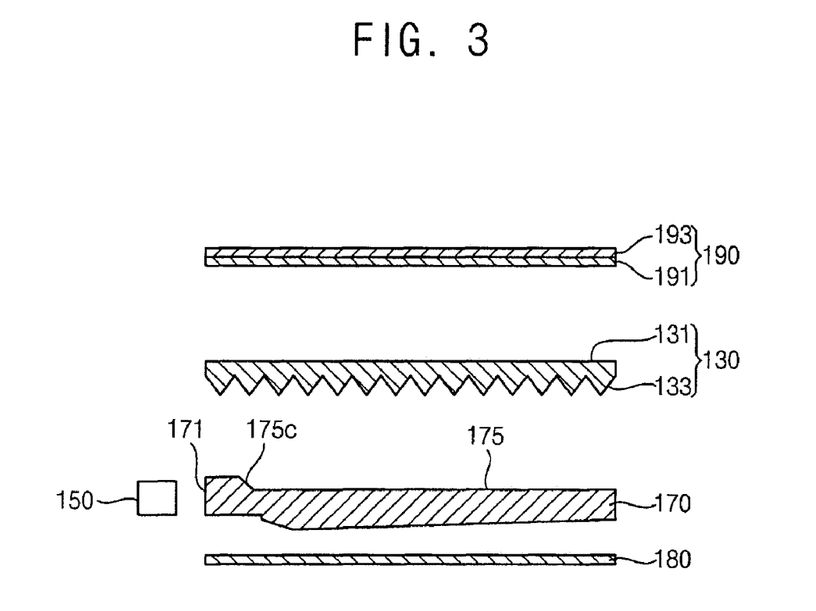
FIG. 3 is a cross-sectional view of the display device taken along a line I-I' shown in FIG. 2, according to an exemplary embodiment of the present invention.

Hereinafter, with reference to FIGS. 2 and 3, a backlight assembly according to an exemplary embodiment of the present invention will be described. FIG. 2 is an exploded perspective view illustrating a display device, according to an exemplary embodiment of the present invention. FIG. 3 is a cross-sectional view of the display device taken along a line I-I' shown in FIG. 2, according to an exemplary embodiment of the present invention.

Referring to FIGS. 2 and 3, the display device 100 includes a display panel 190 and a backlight assembly 120. The display panel 190 displays an image based on a driving signal and a data signal that are provided from an exterior to the display panel. The display panel 190 includes an array substrate 191, an opposite substrate 193 opposite to the array substrate 191, and a liquid crystal layer (not shown) interposed between the array substrate 191 and the opposite substrate 193.

The backlight assembly 120 is disposed at the back of the display panel 190 displaying images according to driving signals and data signals provided by the outside device to provide light (e.g., white light). The backlight assembly 120 comprises light sources 150 generating light to illuminate the liquid crystal panel 190, a light guiding plate 170 receiving the light from the light source 150 and emitting the light to the liquid crystal panel 190, and a set of optical sheets disposed between the light guiding plate 170 and the liquid crystal panel 190. In the present embodiment, the backlight assembly 120 is of the edge type where the light sources 150 are disposed at one side surface of the light guiding plate 170.

The light source 150 according to one embodiment of the present invention is a point light source, such as a light emitting diode (LED). The light emitting diode, used as light source 150, may be a White LED or a combination of R, G, B LED emitting red light, green light and blue light, respectively.

Alternatively, linear light source such as a cold cathode fluorescent lamp (CCFL) and an external electrode fluorescent lamp (EEFL) may be used as a light source. In the case of an edge type backlight assembly adopting the linear light source, the light leakage phenomenon of the incident portion of a light guiding plate can be reduced by adopting the light guiding plate of the present invention.

The light guiding plate 170 guides the light exiting from the light source 150 toward a back surface of the display panel 190. The light guiding plate 170 includes a light incident surface 171, an opposite surface 173, a light emitting surface 175, and a light guide surface 177. The light incident surface 171 and the opposite surface 173 are side surfaces of the light guiding plate 170 and face each other. The light source 150 faces the light incident surface 171. For example, a plurality of light sources 150 may be spaced apart from each other. The light emitting surface 175 faces the back surface of the display panel 190, and is connected to the light incident surface 171 and the opposite surface 173. Referring to FIG. 3, the light emitting surface 175 includes a first inclined surface 175c formed near the incident surface 171. The thickness of the light guiding plate 170 of the first inclined surface 175c gets smaller as the distance from the incident surface 171 increases.

Figure 4:
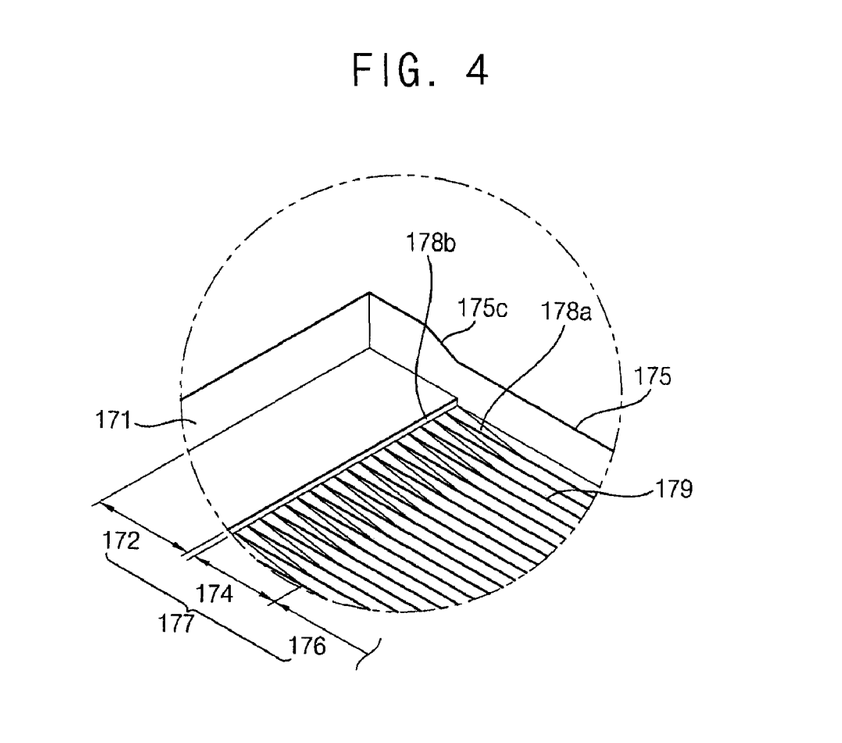
FIG. 4 is a perspective view illustrating a light guide surface of a light guiding plate shown in FIG. 2, according to an exemplary embodiment of the present invention.

FIG. 4 is a perspective view illustrating a light guide surface 177 of a light guiding plate 170 shown in FIG. 2, according to an exemplary embodiment of the present invention.

Referring to FIG. 4, the light guide surface 177 is a back surface of the light guiding plate 170.

The light guide surface 177 guides the light incident into the light guiding plate 170 through the light incident surface 171 to increase luminance uniformity. The light guide surface 177 may include a non-prism area 172, a connection area 174 and a prism area 176. The non-prism area 172 is flat area contacting with the light incident surface 171, and a prism is not formed therein. And non-prism area 172 has a band shape having a constant width. In the prism area 176a plurality of first linear shaped prisms 179 extend in a direction from the light incident surface 171 towards the opposite surface 173. The connection area 174 is interposed between the non-prism area 172 and the prism area 176. The non-prism area 172, the connection area 174 and the prism area 176 will be explained later.

According to a type of light source 150, a light source reflector (not shown) may be disposed outside the light source 150. The light source reflector may be made of metal or plastics and inner surface of the light source reflector and may be coated with light reflective materials. The light source reflector reflects the light generated from the light source 150 to be input into the light guiding plate 170 through its side surface (i.e., the light incident surface 171), thus the light efficiency of the backlight assembly 120 can be improved.

The light exiting from the light source 150 is incident into the light guiding plate 170 through the light incident surface 171. The light incident into the light guiding plate 170 is repetitively reflected from the light incident surface 171, the opposite surface 173, the light guide surface 177, and the light emitting surface 175 to exit light through the light emitting surface 175, which has a predetermined exiting angle range. When the light is repetitively reflected in the light guiding plate 170 through a total reflection, luminance uniformity of the light exiting the light emitting surface 175 is increased.

The light guiding plate 170 mixes the light input through the light incident surface 171 before emitting the light through the light emitting surface 175 while transporting the light in a direction substantially parallel to the viewing plane of the liquid crystal panel 190 located at the upper position by the principle of the total reflection. The upper surface of the light guiding plate 170 becomes the light emitting surface 175 for emitting the light toward the position of the liquid crystal panel 190.

In one aspect, the total reflection must be transformed to the scattered reflection in order for the light at the inside of the light guiding plate 170 to be emitted toward the liquid crystal panel 190. For this purpose, light scattering patterns may be printed on the lower surface of the light guiding plate 170 by using dot-printing techniques. Alternatively, a print-less type of light guiding plate 170 which has the light scattering patterns (not shown) obtained by forming grooves or prism patterns on a surface of the light guiding plate 170 may be used.

The light guiding plate 170 may be formed of a transparent resin, such as Polymethyl-methacrylate (PMMA) or Polycarbonate. The light guiding plate 170 may be made to have a thicker incident portion than the opposing portion to the incident portion, or to have optical patterns on the back surface, which will be described in detail referring to the drawings.

The backlight assembly may include a reflector sheet 180. The reflector sheet 180 is disposed under the light guiding plate 170 to re-input the light emitted through the lower surface of the light guiding plate 170 into the inside of the light guiding plate 170.

The backlight assembly 120 comprises at least one optical sheet disposed between the light guiding plate 170 and the liquid crystal panel 190. The optical sheets are disposed between the light emitting surface 175 of the light guiding plate 170 and the back surface of the display panel 190. The optical sheets increase luminance uniformity and front luminance so that the light having improved optical characteristics is incident into the back surface of the display panel 190.

According to one embodiment of the present invention, referring to FIGS. 2 and 3, the optical sheets include a reverse prism sheet 130. A reverse prism sheet 130 increases the brightness of the light emitted from the light guiding plate 170.

Alternatively, the optical sheets may include at least one diffusing sheet (not shown). The diffusing sheet increases the brightness uniformity by diffusing the light emitted from the light guiding plate 170 or the reverse prism sheet 130.

Hereinafter, a reverse prism sheet 130 will be described in detail with reference to the FIG. 3, according to an exemplary embodiment of the present invention. A reverse prism sheet 130 comprises a base film 131 and a plurality second linear shaped prisms 133 protruding toward the light emitting portion of the light guiding plate 170 and disposed on the lower surface of the base film 131. The cross-section of the second linear shaped prisms 133 is triangular shaped. The second linear shaped prisms 133 may be recessed or protruded on the back surface of the light guiding plate 170. The second linear shaped prisms 133 may be substantially perpendicular to the first linear shaped prisms. Alternatively, third linear shaped prisms (not shown) may be formed on an upper surface of the light guiding plate 170, which is the light emitting surface 175, and the second linear shaped prisms 133 may be substantially perpendicular to the third linear shaped prisms.

When a plurality of linear shaped prisms are formed only on the lower surface of the light guiding plate 170, the second linear shaped prisms 133 are disposed in a perpendicular direction to the lower prism pattern of the light guiding plate 170. Whereas, when a plurality of linear shaped prisms are formed on the lower and upper surface of the light guiding plate 170, the second linear shaped prisms 133 are disposed in a perpendicular direction to the upper prism pattern of the light guiding plate 170.

Hereinafter, the case which the first linear shaped prisms 179 are formed only on the lower surface of the light guiding plate 170, namely the light guiding surface 177, will be described as an example in the present embodiment. Therefore, the second linear shaped prisms 133 of the reverse prism sheet 130, according to one embodiment of the present invention, are disposed in a perpendicular direction to the lower prism pattern 179 of the light guiding plate 170. By doing so, the brightness of display device can be enhanced without adding any prism sheets. Alternatively, the optical sheets may include at least one diffusion sheet disposed under or on the reverse prism sheet 130.

Figure 5A:
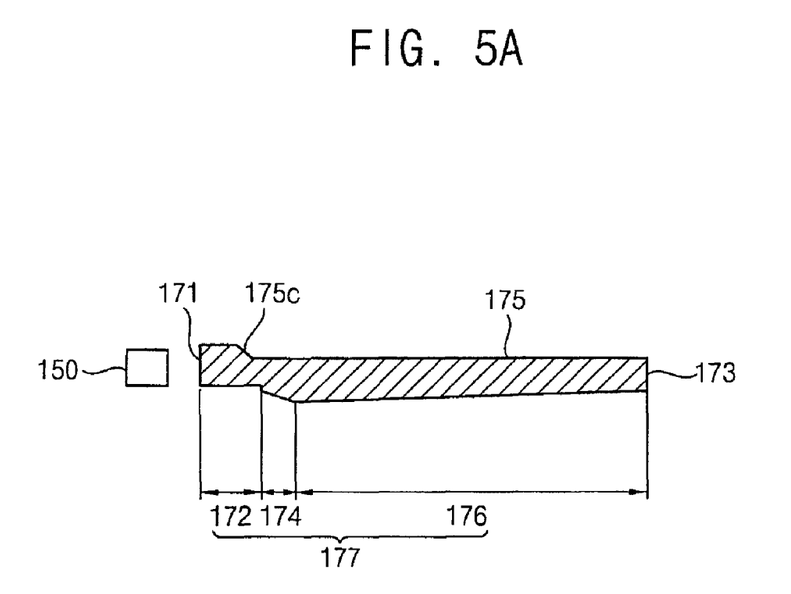
FIGS. 5A and 5B are cross-sectional views illustrating examples of the light guiding plate shown in FIG. 3, according to exemplary embodiments of the present invention.
Figure 5B:
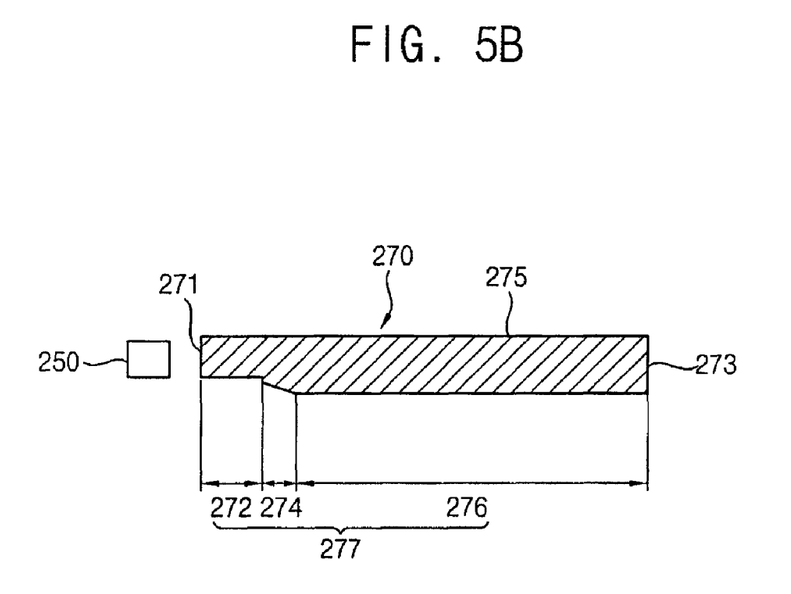

Hereinafter, the light guiding plate 170 according to one embodiment of the present invention will be described in detail with reference to the drawings. FIGS. 5A and 5B are cross-sectional views illustrating examples of the light guiding plate 170 shown in FIG. 3, according to exemplary embodiments of the present invention. Referring to FIGS. 5A and 5B, the light guiding plate 170 may have various shapes.

For example, referring to FIG. 5A, the light guiding plate 170 may be a slope type light guiding plate which has thicker incident portion, where the light emitted from the light source 150 enters therethrough, than the opposing portion.

Alternatively, referring to FIG. 5B, the light guiding plate 270 may be a flat type light guiding plate 270, and the thickness of the incident portion and the opposing portion is substantially the same in this type.

The flat type light guiding plate 270 is formed flat by omitting the first inclined surface 175c of the slope type light guiding plate 170, and entire thickness thereof is uniform. Since the emitting surface 275 of the flat type light guiding plate 270 is flat, the arrangement of the optical sheet on the emitting surface 275 may be easier than the slope type.

Referring back to FIG. 2, the backlight assembly has a slope type light guiding plate of the FIG. 5a. Namely, the thickness of the incident portion (D1) is larger than the thickness of the opposing portion (D2), and the thickness of the incident portion (D1) is equal to or larger than the thickness of the light source 150.

Figure 6:
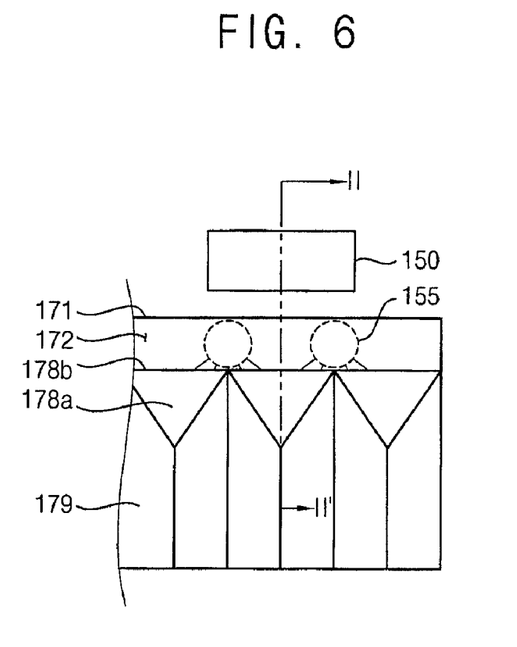
FIG. 6 is a plan view illustrating a light guide surface of the light guiding plate shown in FIG. 4, according to an exemplary embodiment of the present invention.
Figure 7:
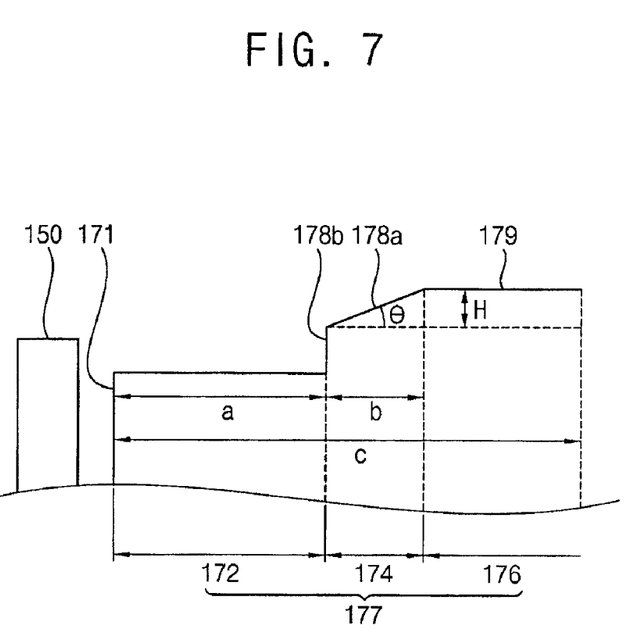
FIG. 7 is a cross-sectional view taken along a line II-II' shown in FIG. 6, according to an exemplary embodiment of the present invention.

FIG. 6 is a plan view illustrating a light guide surface 177 of the light guiding plate 170 shown in FIG. 4, according to an exemplary embodiment of the present invention. FIG. 7 is a cross-sectional view taken along a line II-II' shown in FIG. 6, according to an exemplary embodiment of the present invention.

Referring to FIGS. 5A through 7, the light guiding surface 177 has the non-prism area 172, the connection area 174, and the prism area 176. The non-prism area 172 makes contact with the light incident surface 171 and has a band shape extended in a longitudinal direction of the light incident surface 171. The band shape of the non-prism area 172 has a constant width.

The connection area 174 is interposed between the non-prism area 172 and the prism area 176. The connection area 174 is formed so that the height of the connection area 174 is different from that of the non-prism area 172. Therefore, the connection area 174 may further include a stepped surface 178b protruding from the back surface of the non-prism area 172 toward the external of the light guiding plate 170.

A plurality of first linear shaped prism patterns 179 are disposed on the back surface of a light guiding plate 170 in the prism area 176. The first linear shaped prisms 179 are extended in a direction from the light incident surface 171 toward the opposite surface 173. The cross-section of the first linear shaped prism 179 may be triangular shaped, and, as described early, the first linearly shaped prisms 179 on the back surface of the light guiding plate 170 are extended in a perpendicular direction to the second linear shaped prisms 133 of the reverse prism sheet 130.

In a case where the prism patterns are formed at the incident portion, the light emitted from the LED, which is disposed near the incident portion, easily travels along the prism on the back surface of the light guiding plate 170 toward the opposing portion than other case where the prism patterns are not disposed at the incident portion. Therefore, the hot spot of the incident portion gets worse and the displaying quality of the display device is degraded because of the light leakage of the incident portion of the light guiding plate 170.

To solve that problem, in one example, the prism patterns 179 of the light guiding plate 170, according to one embodiment of the present invention, are partially eliminated from the incident portion such that non-prism area 172 (e.g., "a" area in FIG. 6) is formed at the incident portion side. The connection area 174 which is higher than the non-prism area 172 is formed adjacent the non-prism area 172. According to one or more embodiments, there may be prism patterns at the connection area 174 under the condition that the connection area 174 is disposed at higher position than the non-prism area 172. Namely, the prism patterns may not be eliminated at the connection area 174. Hereinafter, however, the connection area 174 without any prism pattern will be described as an example.

One cause of the height difference between the connection area 174 and the non-prism area 172 is that the thickness of the light guiding plate 170 of the connection area 174 is thicker than that of the light guiding plate 170 of the non-prism area 172. As such, a hot spot due to the LED light can be bared in the connection area 174, and the leakage light of the incident portion of the light guiding plate 170 cannot move toward the opposing portion of the light guiding plate 170 over the connection area 174.

Even though not shown, according to another embodiment, a plurality of step shaped walls may be disposed in the connection area 174 to prevent the hot spot from moving toward the opposing portion of the light guiding plate 170. According to still another embodiment, the thickness of the light guiding plate 170 gradually increases as approaching to the prism area 176 such that the connection area 174 includes a slanted area having an inclined plane 178a (e.g., "b" area in FIG. 6), which is slanted to a predetermined angle. Namely, the thickness of the connection area 174 is equal to or smaller than that of the prism area 176 of light guiding plate 170.

In FIG. 7, the inclined plane 178a is formed between the connection area 174 starting end and the prism area 176. However, the inclined plane 178a may be formed behind flat area (not shown) which extends from the connection area starting end to a predetermined distance. The inclined surface 178a has a triangular shape and both sides of the triangle contact the prism of the prism area 176.

According to one embodiment of the present invention, the width of the non-prism area 172 (e.g., the width of the "a" area in FIG. 7) is equal to or longer than that of the connection area 174 (e.g., the width of the "b" area in FIG. 7), and the summation of the width of the non-prism area 172 and the connection area 174 is equal to or shorter than the distance (the "c" in FIG. 7) from the incident portion end to an active area of the light guiding plate 170. Here, the active area means an effective light emitting area of the light guiding plate 170 corresponding to the display plane of the liquid crystal panel 190 According to another embodiment of the present invention, the width of the "a" has a value at least 0.5 mm. Also, the width of the connection area 174 (b) is in a range between the thickness of light guiding plate 170 (hereinafter, "T") and the triple thickness of the light guiding plate 170 (3 T). Namely, T≦b≦3 T.

The gradient (θ) of the inclined plane 178a has an arc tangent value of the ratio of the width of the connection area 174 (b) over the height of the prism of the prism area 176 with standard to the lowest point of the inclined plane 178a (H). Namely, θ=tan−1(b/H). In a preferable embodiment, the gradient (θ) is smaller than 1 degree.

Figure 8A:
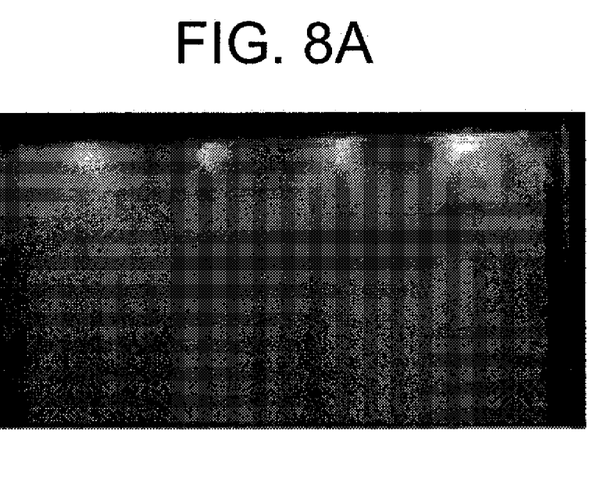
FIG. 8A is an image illustrating a light emitting surface adjacent to a light incident surface of the light guiding plate shown in FIG. 1.
Figure 8B:
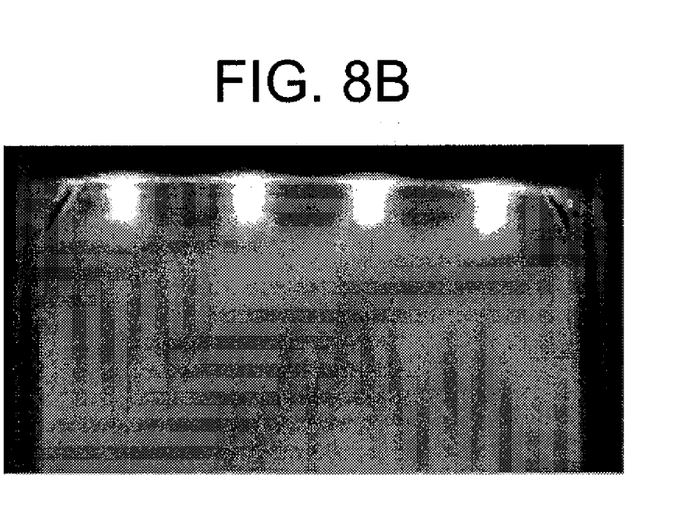
FIG. 8B is an image illustrating a light emitting surface adjacent to a light incident surface of the light guiding plate shown in FIGS. 2 to 7, according to an exemplary embodiment of the present invention.
Figure 9A:
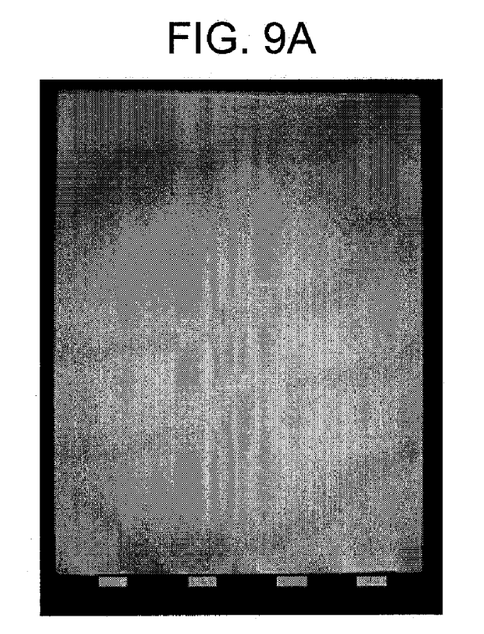
FIG. 9A is an image illustrating a display screen of a display device having the backlight assembly shown in FIG. 1.
Figure 9B:
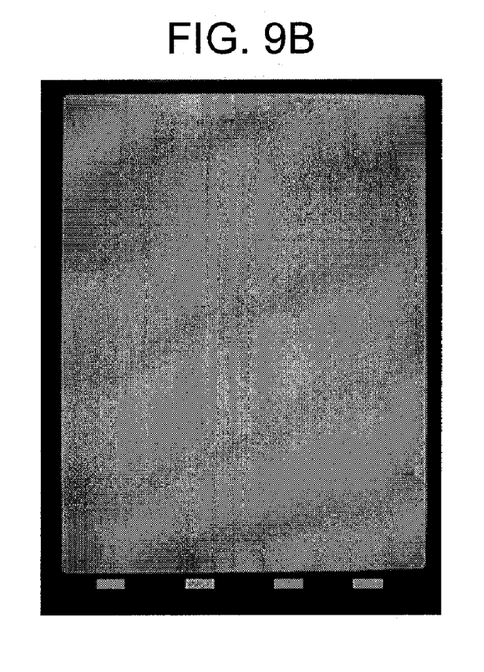
FIG. 9B is an image illustrating a display screen of a display device having the backlight assembly shown in FIGS. 2 to 7, according to an exemplary embodiment of the present invention.

FIG. 8A is an image illustrating a light emitting surface adjacent to a light incident surface of the light guiding plate shown in FIG. 1. FIG. 8B is an image illustrating a light emitting surface 175 adjacent to a light incident surface 171 of the light guiding plate 170 shown in FIGS. 2 to 7, according to an exemplary embodiment of the present invention. FIG. 9A is an image illustrating a display screen of the display device having the backlight assembly 120 shown in FIG. 1. FIG. 9B is an image illustrating a display screen of the display device having the backlight assembly 120 shown in FIGS. 2 to 7, according to an exemplary embodiment of the present invention.

In one aspect, referring to FIG. 8A, the non-prism area 172 and the stepped surface 178b are not formed on the back surface of the light guiding plate 170, and the first linear shaped prisms are formed on an entire back surface of the light guiding plate 170. The light incident into the light guiding plate 170 through the light incident surface 171 is diffused in various directions by the first linear shaped prisms 179. Thus, a bright spot (as shown in FIG. 8A) on which luminance is greater than ambient portion may be formed in a region adjacent to the light incident surface 171 of the light guiding plate 170. Therefore, luminance uniformity of the display screen adjacent to the light incident surface 171 may be deteriorated and light may leak, thereby deteriorating the image display quality.

To improve the image display quality, the prisms 179 are not formed in the non-prism area 172 of the exemplary embodiments of the present invention. For example, the first linear shaped prisms 179 are formed on the entire light guiding surface 177, and a portion of the first linear shaped prisms is removed to form the non-prism area 172. In one aspect, the non-prism area 172 and the connection area are 174 connected to each other through a stepped portion. In another aspect, the stepped portion may prevent the diffusion of the light adjacent to the light incident surface 171.

The stepped portion is formed between the connection area 174 and the non-prism area 172, and the thickness of the light guiding plate 170 in the connection area 174 is greater than the thickness of the light guiding plate 170 of the non-prism area 172. In FIG. 8B, the bright spot caused by the diffused light is confined in the non-prism area 172. In FIG. 9B, the bright spot and a dark spot adjacent to the light incident surface 171 may not be displayed in the display area of the display panel 190.

The light guiding plate 170 includes one stepped portion on the connection area 174 with the non-prism area 172. Alternatively, the light guiding plate may include a plurality of stepped portions with the non-prism area 172. The diffused light may be blocked by the stepped portion between the non-prism area 172 and the connection area 174 so that light leakage may be prevented. In one aspect, the light leakage may be prevented by the stepped surface 178b formed in the connection area 174.

Figure 10:
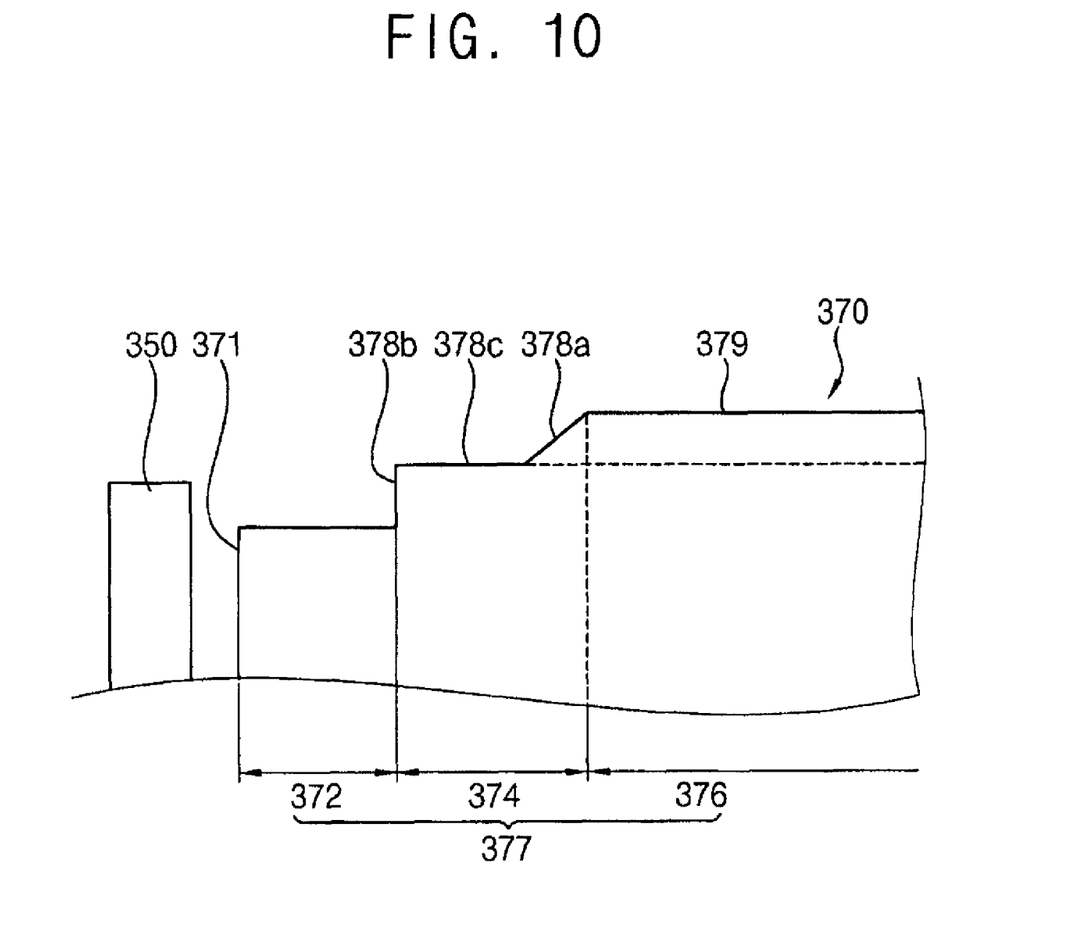
FIG. 10 is an enlarged cross-sectional view of a light guiding plate, according to another exemplary embodiment of the present invention.

FIG. 10 is an enlarged cross-sectional view of a light guiding plate 370 according to another exemplary embodiment of the present invention. The light guiding plate 370 of FIG. 10 is substantially the same as the light guiding plate 170 shown in FIGS. 2 to 7 except the prisms in the connection area 374. Thus, any further repetitive explanation concerning the above element will be omitted.

The connection area 374 has different height from that of the non-prism area 372. And the level surface 378c is formed with a constant width and perpendicular to the stepped surface 378b. A second inclined surface 378a is disposed adjacent to the level surface 378c and connected to the first linear shaped prisms 379 of the prism area 376.

The backlight assembly and the display device of FIG. 10 are substantially the same as the backlight assembly 120 and the display device of FIGS. 2 to 7, according to an exemplary embodiment of the present invention. Thus, any repetitive explanation concerning the above elements will be omitted.

The first linear shaped prisms 379 of the light guiding plate 370 are spaced apart from an edge of the connection area 374, namely the stepped surface 378b, so that the light incident into the light incident surface 371 may be guided in a diagonal direction along the first linear shaped prisms, thereby preventing the bright spot adjacent to the light incident surface 371.

As described above, according to one or more embodiments of the present invention, the prism patterns at the incident portion of the light guiding plate are removed partially and the connection area is form adjacent the non-prism area such that the display quality degradation due to the hot spot of the incident portion side may be prevented and the brightness uniformity of the display device may be enhanced.

Although exemplary embodiments of the present invention have been described, it is understood that the present invention should not be limited to these exemplary embodiments but various changes and modifications can be made by one of ordinary skilled in the art within the spirit and scope of the present invention as hereinafter claimed.

What is claimed is:

1. A light guiding plate comprising:
   a light incident surface where light emitted from a light source enters;
   an opposite surface facing the light incident surface;
   a light emitting surface coupled between the light incident surface and the opposite surface; and
   a light guide surface facing the light emitting surface, the light guide surface having a prism area in which a plurality of linear shaped prisms are formed, each linear shaped prism having a short axis along a cross-section of the linear shaped prism and a long axis perpendicular to the short axis and extending along a length of the linear shaped prism, the long axis of each linear shaped prism extending from the light incident surface toward the opposite surface, a non-prism area in which a flat area is formed adjacent to the light incident surface, and a connection area interposed between the prism area and the non-prism area and having a different height with respect to the non-prism area,
   wherein a height of the light incident surface is greater than the different height of the connection area with respect to the non-prism area, and most of the light emitted from the light source enters the light incident surface.

2. The light guiding plate of claim 1, wherein the non-prism area makes contact with the light incident surface, and wherein the non-prism area includes a band shape having a constant width.

3. The light guiding plate of claim 1, wherein the connection area has a stepped portion formed by protruding from the non-prism area toward an exterior to the light guiding plate.

4. The light guiding plate of claim 3, wherein a thickness of the light guiding plate in the connection area is greater than a thickness of the light guiding plate in the non-prism area.

5. The light guiding plate of claim 4, wherein the thickness of the light guiding plate in the connection area is equal to or smaller than a thickness of the light guiding plate in the prism area.

6. The light guiding plate of claim 5, wherein an inclined surface making contact with the stepped portion is formed on an end of each of the linear shaped prisms, which is extended toward the connection area.

7. The light guiding plate of claim 6, wherein the inclined surface has a substantially triangular shape.

8. The light guiding plate of claim 5, wherein the connection area has a level surface substantially perpendicular to the stepped portion, and wherein an inclined surface is formed on an end of each of the linear shaped prisms making contact with the level surface.

9. A backlight assembly comprising:
a light source generating light;
a light guiding plate including:
a light incident surface into which the light is incident;
an opposite surface facing the light incident surface;
a light emitting surface coupled between the light incident surface and the opposite surface; and
a light guide surface facing the light emitting surface, the light guide surface having a prism area in which a plurality of first linear shaped prisms are formed, each first linear shaped prism having a short axis along a cross-section of the first linear shaped prism and a long axis perpendicular to the short axis and extending along a length of the first linear shaped prism, the long axis of each first linear shaped prism extending from the light incident surface toward the opposite surface, a non-prism area in which a flat area is formed adjacent to the light incident surface, and a connection area interposed between the prism area and the non-prism area and having a different height with respect to the non-prism area; and
optical sheets disposed on the light emitting surface,
wherein a height of the light incident surface is greater than the different height of the connection area with respect to the non-prism area, and most of the light emitted from the light source enters the light incident surface.

10. The backlight assembly of claim 9, wherein the connection area has a stepped portion formed by protruding from the non-prism area toward an exterior to the light guiding plate.

11. The backlight assembly of claim 10, wherein a thickness of the light guiding plate in the connection area is greater than a thickness of the light guiding plate in the non-prism area.

12. The backlight assembly of claim 11, wherein the thickness of the light guiding plate in the connection area is equal to or smaller than a thickness of the light guiding plate in the prism area.

13. The backlight assembly of claim 12, wherein an inclined surface making contact with the stepped portion is formed on an end of each of the first linear shaped prisms, which is extended toward the connection area.

14. The backlight assembly of claim 9, wherein a plurality of second linear shaped prisms is formed on a back surface of the optical sheets, and an extension direction of the first linear shaped prisms is substantially perpendicular to an extension direction of the second linear shaped prisms.

15. A display device comprising:
a display panel displaying an image;
a light source emitting light for displaying the image;
a light guiding plate including:
a light incident surface into which the light is incident;
an opposite surface facing the light incident surface;
a light emitting surface coupled between the light incident surface and the opposite surface; and
a light guide surface facing the light emitting surface, the light guide surface including a prism area having a plurality of first linear shaped prisms, each first linear shaped prism having a short axis along a cross-section of the first linear shaped prism and a long axis perpendicular to the short axis and extending along a length of the first linear shaped prism, the long axis of each first linear shaped prism extending from the light incident surface toward the opposite surface, a non-prism area that has a flat area adjacent to the light incident surface, and a connection area interposed between the prism area and the non-prism area and having a different height with respect to the non-prism area; and
optical sheets disposed on the light emitting surface,
wherein a height of the light incident surface is greater than the different height of the connection area with respect to the non-prism area, and most of the light emitted from the light source enters the light incident surface.

16. The display device of claim 15, wherein the connection area has a stepped portion formed by protruding from the non-prism area toward an exterior to the light guiding plate.

17. The display device of claim 16, wherein a thickness of the light guiding plate in the connection area is greater than a thickness of the light guiding plate in the non-prism area.

18. The display device of claim 17, wherein the thickness of the light guiding plate in the connection area is equal to or smaller than a thickness of the light guiding plate in the prism area.

19. The display device of claim 15, wherein a plurality of second linear shaped prisms is formed on a back surface of the optical sheets, and wherein an extension direction of the first linear shaped prisms is substantially perpendicular to an extension direction of the second linear shaped prisms.

20. The display device of claim 15, wherein the light source comprises a light emitting diode (LED), and wherein at least one LED is disposed on at least one side surface of the light guiding plate, which includes the light incident surface.

* * * * *